(12) United States Patent
McClendon et al.

(10) Patent No.: US 9,230,366 B1
(45) Date of Patent: Jan. 5, 2016

(54) IDENTIFICATION OF DYNAMIC OBJECTS BASED ON DEPTH DATA

(71) Applicant: Google Inc., Mountain View, CA (US)

(72) Inventors: Brian McClendon, Portola Valley, CA (US); Jonah Jones, San Francisco, CA (US)

(73) Assignee: Google Inc., Mountain View, CA (US)

( * ) Notice: Subject to any disclaimer, the term of this patent is extended or adjusted under 35 U.S.C. 154(b) by 77 days.

(21) Appl. No.: 14/136,647

(22) Filed: Dec. 20, 2013

(51) Int. Cl.
*G06K 9/00* (2006.01)
*G06T 17/05* (2011.01)
*G06T 7/20* (2006.01)

(52) U.S. Cl.
CPC ............... *G06T 17/05* (2013.01); *G06T 7/2086* (2013.01)

(58) Field of Classification Search
CPC combination set(s) only.
See application file for complete search history.

(56) References Cited

U.S. PATENT DOCUMENTS

| | | | |
|---|---|---|---|
| 6,169,966 B1* | 1/2001 | Miura et al. | 702/142 |
| 6,384,859 B1* | 5/2002 | Matsumoto et al. | 348/43 |
| 7,515,735 B2* | 4/2009 | Miyamori | 382/103 |
| 8,060,302 B2 | 11/2011 | Epshtein et al. | |
| 8,238,606 B2* | 8/2012 | Sasaki | 382/103 |
| 2001/0045979 A1* | 11/2001 | Matsumoto et al. | 348/43 |
| 2005/0254686 A1* | 11/2005 | Koizumi | 382/103 |
| 2006/0173292 A1* | 8/2006 | Baba et al. | 600/425 |
| 2011/0262109 A1* | 10/2011 | Schreckenberg et al. | 386/326 |
| 2012/0020521 A1* | 1/2012 | Yamagami et al. | 382/103 |
| 2013/0322688 A1* | 12/2013 | Tsuchiya et al. | 382/103 |

* cited by examiner

*Primary Examiner* — Anand Bhatnagar
(74) *Attorney, Agent, or Firm* — Lerner, David, Littenberg, Krumholz & Mentlik, LLP

(57) ABSTRACT

A system and method is provided that identifies dynamic objects within a set of photographic images. The objects may be identified as dynamic based on depth data associated with the images. The depth data may also be used to determine the potential states of the dynamic objects within the set of images. A three-dimensional model be created in which the dynamic objects are displayed in accordance with one of the potential states.

16 Claims, 9 Drawing Sheets

IDENTIFICATION OF DYNAMIC OBJECTS BASED ON DEPTH DATA

BACKGROUND

Various systems allow users to view images of three-dimensional ("3D") models. These 3D models may include representations of the objects that can be seen at various locations, whether indoors or outdoors. The representation of these objects within the 3D model may be based on photographic images, so as to provide the viewer with an immersive experience as if he or she were viewing the 3D model of a location from a particular viewpoint.

However, the objects within the 3D models are depicted as they appear within one particular image taken at one particular moment in time. Accordingly, the objects are presented within the 3D model as being static, even though some of the depicted objects may exist at different locations or poses at different times. For example, vehicles depicted in a 3D model will likely move from the location in which they were photographed. Current 3D models, therefore, fail to account for dynamic objects that may exist in different states at different times.

SUMMARY

Aspects of the present disclosure provide a method for identifying dynamic objects in a set of images. The method includes accessing, by one or more computing devices, a plurality of images, each having therewith associated depth data; determining, by the one or more computing devices, based at least in part on the depth data for each image in the plurality of images, that a first object, visible within at least one of the plurality of images, is dynamic; identifying, by the one or more computing devices and based on the depth data, a set of potential states of the first object; and selecting, by the one or more computing devices, a state, from the set of potential states, in which the first object is to be displayed.

In one example, the method also includes generating, by the one or more computing devices, a model of objects shown in the plurality of images, including the first object; receiving a request of a user to view the model; and providing a rendering of the model for display to the user. In another example, chronological data may be associated with the plurality of images, and selecting the state in which the first object is to be displayed may be based at least in part on the chronological data. In yet another example, the rendering of the model may display the objects relative to a first point in time, and the selected state of the first object may be based on the first point in time. The method may also include providing a user with map directions, the directions provided to the user may be based at least in part on the selected state of the first object. In addition, the method may include receiving input from a user in connection with the first object, and in response to the received user input, altering the first object from a first state to a second state in the identified set of potential states of the first object.

In another example, the method may include determining, by the one or more computing devices, based on the depth data, that a second object within at least one of the plurality of images is dynamic; identifying, by the one or more computing devices and based on the depth data, a set of potential states of the second object; determining, by the one or more computing devices, that a relationship exists between the set of potential states of the first object and the set of potential states of the second object; selecting, by the one or more computing devices, a state in which the second object is to be displayed within the model based on the determined relationship between the set of potential states of the first object and the set of potential states of the second object.

A further aspect of the disclosure provides a system for identifying dynamic objects in a set of images. The system may include one or more processors configured to: access a plurality of images, each having therewith associated depth data; determine, based at least in part on the depth data for each image in the plurality of images, that a first object, within at least one of the plurality of images, is dynamic; identify a set of potential states of the first object; select a state, from the set of potential states, in which the first object is to be displayed; generate a model of objects shown in the plurality of images, including the first object; receive a request of a user to view the model; and provide a rendering of the model for display to the user. In one example, the rendering of the model displays the objects relative to a first point in time, and the selected state of the first object is based on the first point in time. Chronological data may be associated with the plurality of images, and selecting the state in which the first object is to be displayed may be based at least in part on the chronological data. The one or more processors may be further configured to provide a user with map directions, and the directions provided to the user may be based at least in part on the selected state of the first object.

In another example, the processors are further configured to: determine that a second object within at least one of the plurality of images is dynamic; identify a set of potential states of the second object; determine that a relationship exists between the set of potential states of the first object and the set of potential states of the second object; and select a state in which the second object is to be displayed within the model based on the determined relationship between the set of potential states of the first object and the set of potential states of the second object. In addition, the processors may receive input from a user in connection with the first object, and in response to the received user input, alter the first object from a first state to a second state in the identified set of potential states of the first object.

A further aspect of the disclosure provides a non-transitory computer-readable storage medium on which instructions are stored, the instructions, when executed by one or more processors cause the one or more processors to perform a method that includes: accessing a plurality of images, each having therewith associated depth data; determining, based at least in part on the depth data for each image in the plurality of images, that a first object, within at least one of the plurality of images, is dynamic; identifying, based on the depth data, a set of potential states of the first object; selecting a state, from the set of potential states, in which the first object is to be displayed; generating, by the one or more computing devices, a model of objects shown in the plurality of images, including the first object; receiving a request of a user to view the model; and providing a rendering of the model for display to the user. In one example, the model of objects may displays the objects relative to a first point in time, and the selected state of the first object may be based on the first point in time. In one example, the rendering of the model displays the objects relative to a first point in time, and the selected state of the first object may be based on the first point in time. Chronological data may be associated with the plurality of images, and selecting the state in which the first object is to be displayed may be based at least in part on the chronological data.

DETAILED DESCRIPTION

Overview

Figure 1:
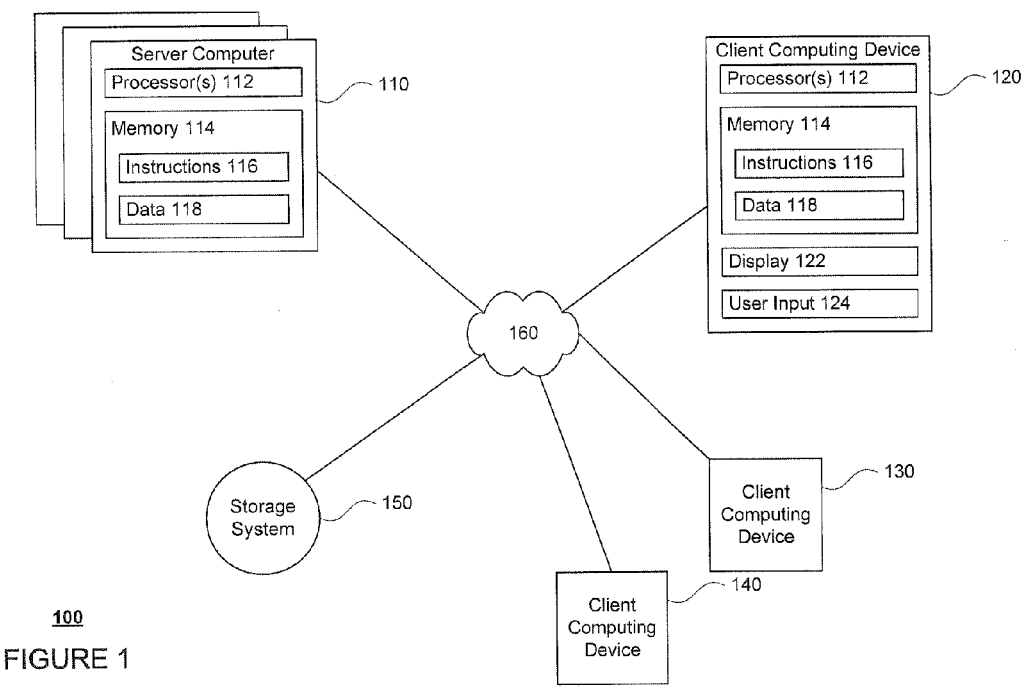
FIG. 1 is a functional diagram of a system in accordance with an exemplary embodiment.

The technology relates generally to identifying objects to be displayed in a rendering of a 3D model as being dynamic, rather than static. In particular, the model 3D image may be based on a set of images that were captured at different dates and times. In some of the images, certain objects may have changed their location or pose. Each image in the set of images may have depth data associated with it, which may be used to determine the changes in the objects' location or pose. The objects that have a changed locations and/or poses may then be tagged as dynamic, so as to designate that they may appear in the 3D model in different locations and/or poses, some of which may be associated with a plurality of states. The system may then select one of the potential states of the object for display. The selection of displayed state may be based on the number of images in which the dynamic object is shown in the selected state, as well as the date and time of the images in which the object is seen in the selected state.

For example, a door within a particular room may be closed in one image but open in another image. In generating a 3D model of the room, a set of images captured in the room may be analyzed to determine that the door is a dynamic object that may be displayed in one of a plurality of states. The 3D model may, in turn, designate the door as having an open state and a closed state, and the 3D model may be rendered to display the door in either state. The selection of the state in which the door is to be displayed may be based on analysis of the set of available images of the door, including analysis of the date and time in which the door is seen in each state.

The 3D model of the room may then be rendered to be displayed on a user's device in the context of a map. The map displayed to the user may mirror the state of the displayed objects, for example, an open door may be indicated on the map as being a potential path that the user may take, while a closed door may be associated with the doorway not being available as a potential path. In one example, the user may select dynamic objects displayed in a rendering of the 3D model and alter their state.

In another example, a set of images may be analyzed in the context of vehicles shown in a street level image. In this example, images may be analyzed to determine that a truck and car shown in one or more images are dynamic objects. The system may determine whether to include the truck and the car in the 3D model based on the images of the location that are available. For example, if the truck is seen in a number of images as being at the location shown in the images, then the 3D model may include the truck as a part of the rendered 3D model. Alternatively, if the car only appears in one image, or a few images, then it may be excluded from the 3D model. In another example, the system may select whether to display vehicles parked on the street based on the day and time the user is accessing the model. For instance, if street is not open for parking at particular times, then the 3D model may be rendered so that no vehicles are displayed as being parked on street at those times.

EXAMPLE SYSTEMS

Figure 2:
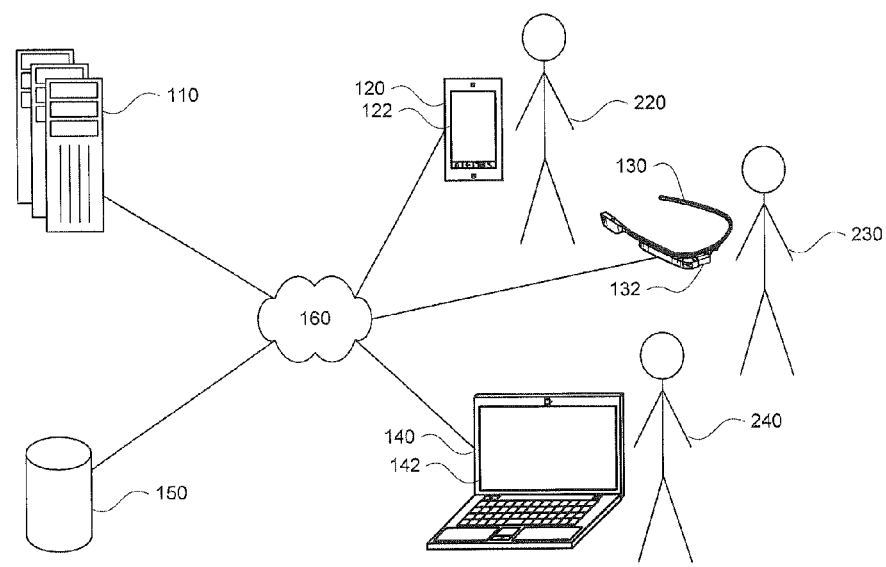
FIG. 2 is a pictorial diagram of a system in accordance with an exemplary embodiment.

FIGS. 1 and 2 depict an example system 100 in which the features described above may be implemented. This example should not be considered as limiting the scope of the disclosure or usefulness of the features described herein. In this example, system 100 includes computing devices 110, 120, 130, and 140 as well as storage system 150. Computing device 110 contains one or more processors 112, memory 114 and other components typically present in general purpose computing devices. Memory 114 of computing device 110 store information accessible by processor 112, including instructions 116 that can be executed by the processor 112.

Memory also includes data 118 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

Data 118 can be retrieved, stored or modified by processor 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can include any conventional processors, such as a commercially available CPU. Alternatively, the processor can be a dedicated component such as an ASIC or other hardware-based processor. Although not necessary, computing devices 110 may include specialized hardware components to perform specific computing processes, such as decoding video, matching video frames with images, distorting videos, encoding distorted videos, etc. faster or more efficiently.

Although FIG. 1 functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in a housing different from that of computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm. Yet further, although some functions described below are indicated as taking place on a single computing device having a single processor, various aspects of the subject matter described herein can be implemented by a plurality of computing devices, for example, communicating information over network 160.

The computing devices 110 can be at various nodes of a network 160 and capable of directly and indirectly communicating with other nodes of network 160. Although only a few computing devices are depicted in FIGS. 1-2, it should be appreciated that a typical system can include a large number of connected computing devices, with each different computing device being at a different node of the network 160.

The network 160 and intervening nodes described herein can be interconnected using various protocols and systems, such that the network can be part of the Internet, World Wide Web, specific intranets, wide area networks, or local networks. The network can utilize standard communications protocols, such as Ethernet, Wi-Fi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, computing devices 110 may include one or more web servers that are capable of communicating with storage system 150 as well as computing devices 120, 130, and 140 via the network. For example, server computing devices 110 may use network 160 to transmit and present information to a user, such as user 220, 250, or 250, on a display, such as displays 122, 132, or 142 of computing devices 120, 130, or 140. In this regard, computing devices 120, 130, and 140 may be considered client computing devices and may perform all or some of the features described below.

Each of the client computing devices may be configured similarly to the server computing devices 110, with one or more processors, memory and instructions as described above. Each client computing device 120, 130 or 140 may be a personal computing device intended for use by a user 220, 250, 250, and have all of the components normally used in connection with a personal computing device such as a central processing unit (CPU), memory (e.g., RAM and internal hard drives) storing data and instructions, a display such as displays 122, 132, or 142 (e.g., a monitor having a screen, a touch-screen, a projector, a television, or other device that is operable to display information), and user input device 125 (e.g., a mouse, keyboard, touch-screen or microphone). The client computing device may also include a camera for recording video streams, speakers, a network interface device, and all of the components used for connecting these elements to one another.

Although the client computing devices 120, 130 and 140 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a head-mounted computing system. As an example the user may input information using a small keyboard, a keypad, microphone, using visual signals with a camera, or a touch screen.

As with memory 114, storage system 150 can be of any type of computerized storage capable of storing information accessible by server computing device 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown in FIG. 1 and/or may be directly connected to or incorporated into any of the computing devices 110-140 (not shown).

Both storage system 150 and memory 114 may store image information. As noted above, this image information may include numerous images that have been captured from various locations and at different dates and times. The images may be taken indoors, such as images 300 and 400 shown in FIGS. 3 and 4, or the images may be taken outdoors, such as images 700 and 800 shown in FIGS. 7 and 8. Accordingly, each image may have metadata associated with it that denotes the location and orientation of the device that captured the image, as well as the date and time the image was taken. In addition, the metadata may include surface information describing the outer surface of objects in an image. For example, each image may be associated with depth data describing the proximity of an object's surface to the location of the device that captured the image. In that regard, each surface within an image may be represented as collection of points. Each point, in turn, may be represented as a vector, whereby each point is stored with respect to its distance to the camera, and its angle with respect to the direction in which the camera is pointed. Such information may be collected by using a laser range finder in combination with the camera taking the images.

Figure 5:
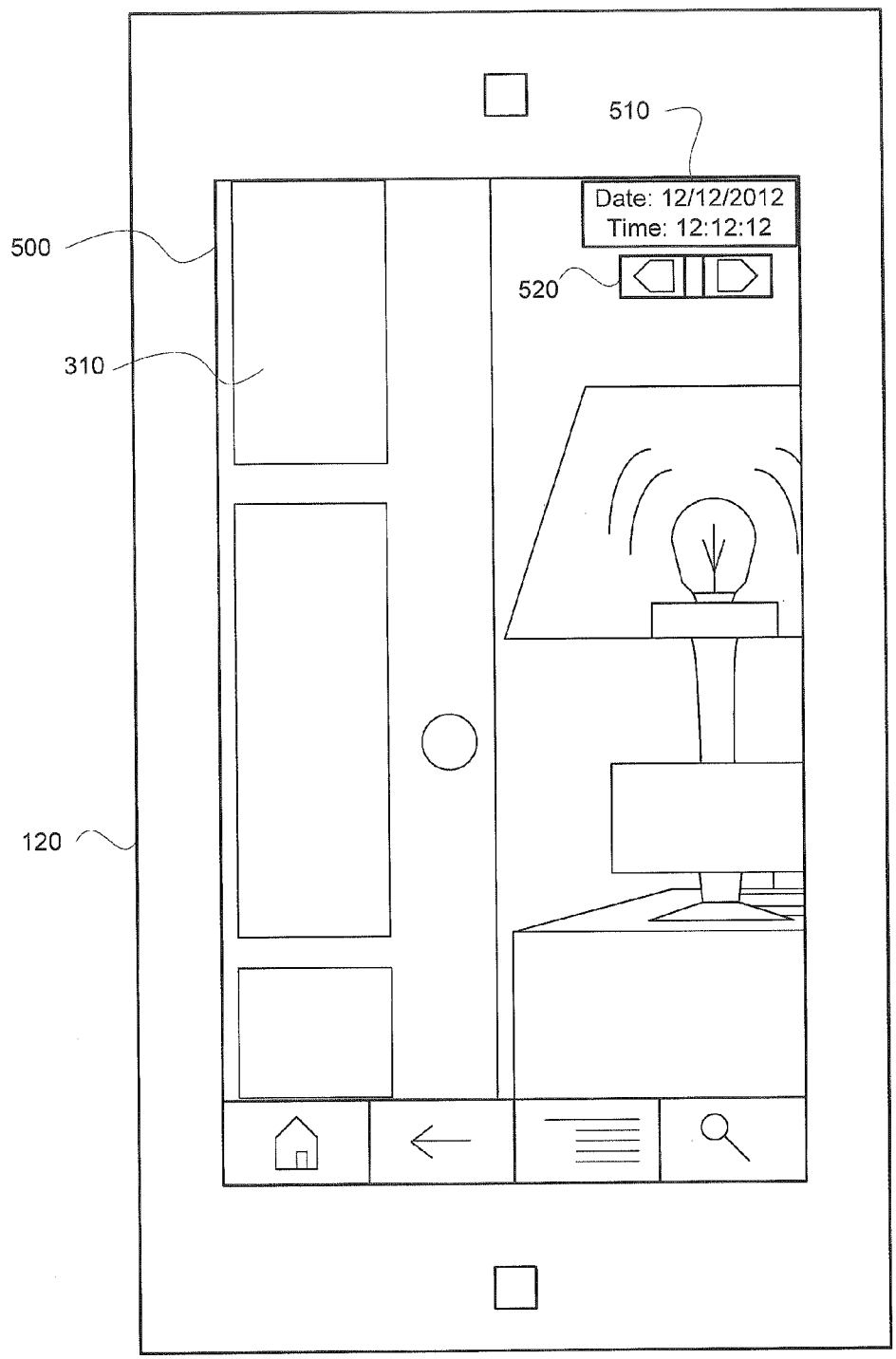
FIG. 5 is a screen shot of a device in accordance with an aspect of the disclosure.
Figure 6:
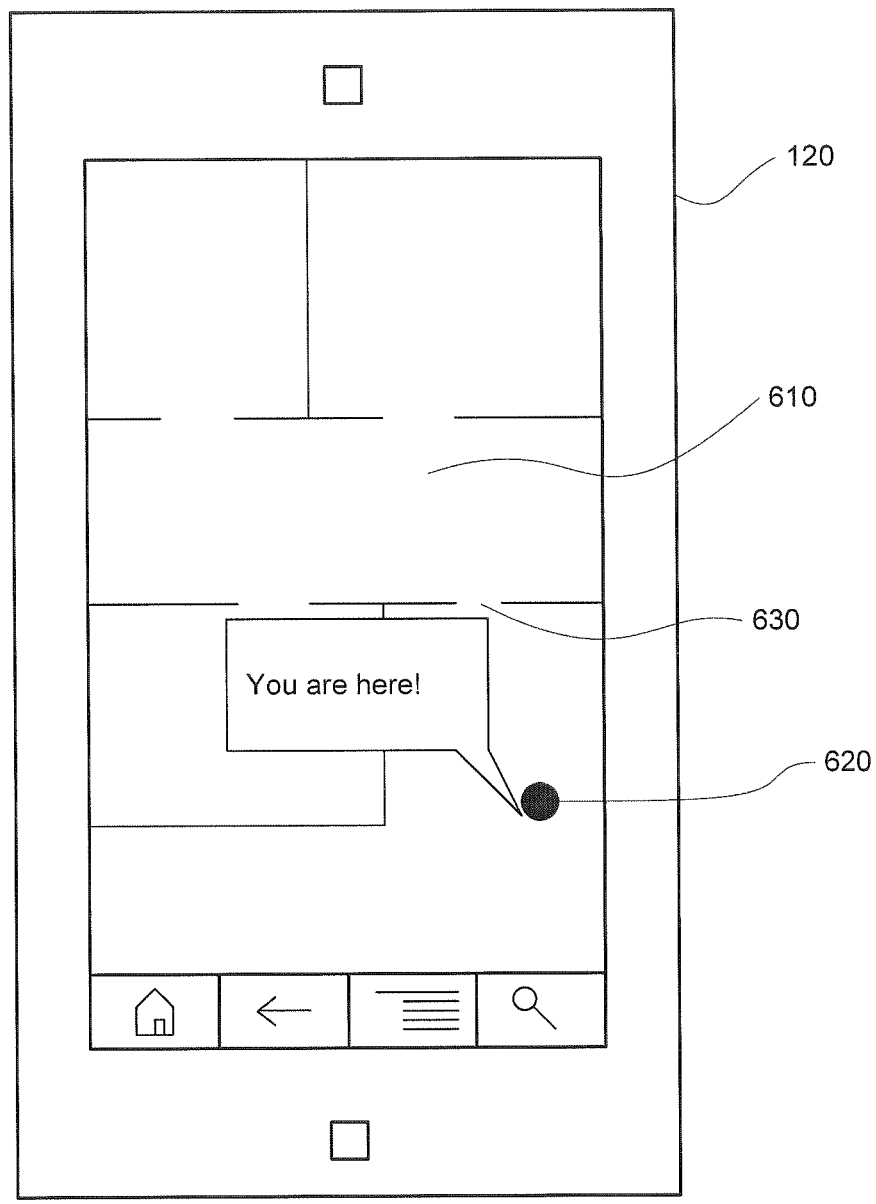
FIG. 6 is a screen shot of a device in accordance with an aspect of the disclosure.

Returning to FIG. 1, storage system 150 and memory 114 may also store 3D models that are based on the images. Renderings of these 3D models may be displayed on computing devices 120, 130, and 140 in connection with one or more applications, such as map and navigation applications. For example, FIG. 5 illustrates device 120 displaying a rendering of a 3D model 500, which is based on image 300 from FIG. 3. In addition, as shown in FIG. 6, device 120 may display map 610 in connection with the 3D model and may indicate the current location 620 of device 120. Accordingly, a user of device 120 may switch between viewing map 610 and viewing a rendering of a 3D model that corresponds to locations within map 610.

The 3D models may be stored as texture data along with the 3D geometry data. The 3D geometry data may include a plurality of polygons defining the outlines of various objects, while the texture data may include the texture or imagery data within those polygons. The 3D geometry information may also include location information location coordinates such as latitude, longitude, altitude, etc. for the geometry. As an example, a 3D model may be stored as a triangular mesh with various textures corresponding to each triangle of the mesh.

EXAMPLE METHODS

Figure 9:
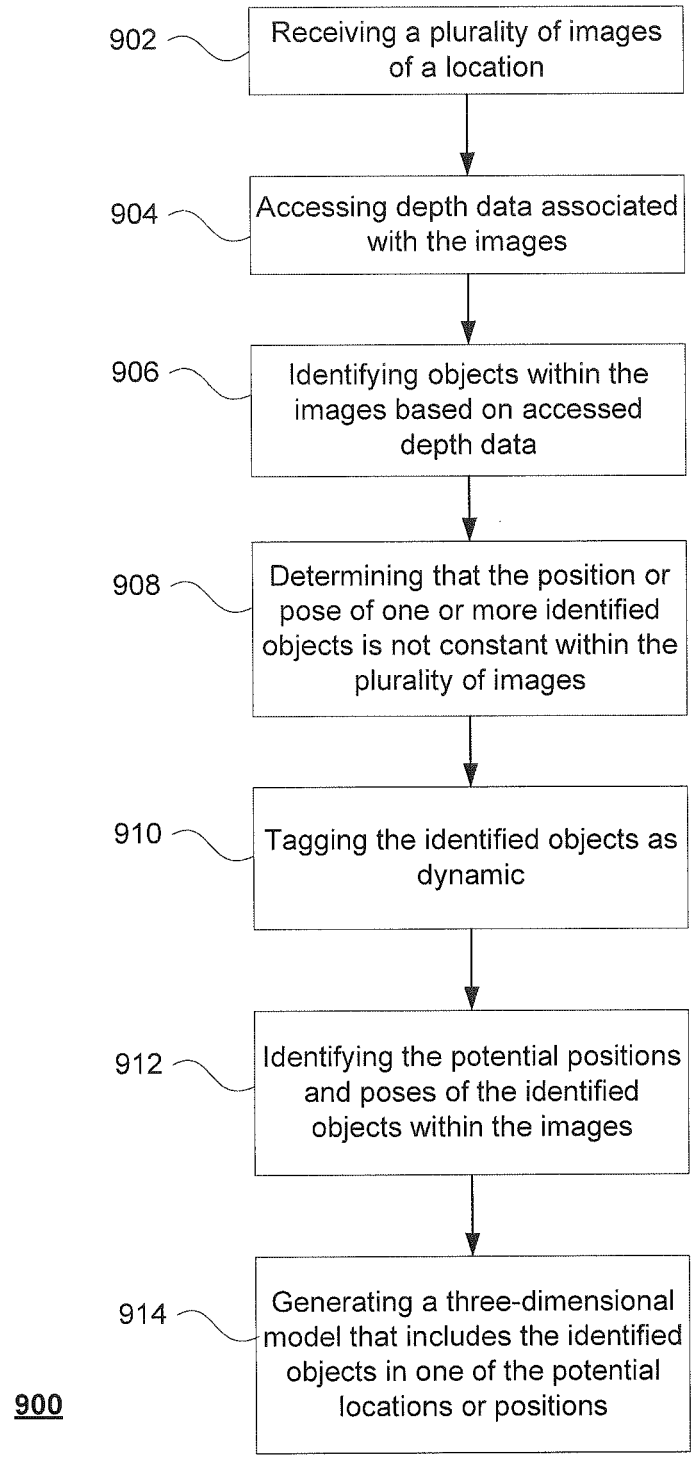
FIG. 9 is a flowchart in accordance with an aspect of the invention.

In creating a 3D model based on images, one or more server computing devices 110 may perform the operations shown flowchart 900, as shown in FIG. 9. As an example, a server computing device 110 may first access a set of images taken at or around a particular location. (Block 902). For example, if server computing device 110 is creating a 3D model of a particular building's interior space, the server may access all of the available images taken within that building and may use location metadata associated with the images to identify the specific room that is depicted in each image. Server computing device 110 may then access depth data associated with each of the accessed images (Block 904) and may identify objects within the images based on accessed depth data (Block 906). For example, server computing device 110 may access a set of images that include images 300 and 400 shown FIGS. 3 and 4, respectively. Using the location metadata described above, server computing device 110 may identify that both images 300 and 400 depict room 302. Server computing device 110 may also use depth data associated with images 300 and 400 to determine the distance from the surface of various objects to the location at which images were captured. The distances may be used to determine the relative locations (relative to the camera that captured the image) or actual (geographical locations) of the objects. In particular, server computing device 110 may identify distances to and locations of door 310, lamp 312, desk 314, and monitor 316, as well as other objects within images 300 and 400.

Using the determined locations, server computing device 110 may then identify whether any object has changed its location or pose within any of the accessed images (Block 908). Any object identified as having changed its location or pose may than be tagged as a dynamic object (Block 910). In addition, server computing device 110 may identify the specific locations and poses in which the tagged dynamic object appears within the accessed images (Block 912). For example, by analyzing the images shown in FIGS. 3 and 4, including the associated depth data, it may be determined that the location of door 310 changes between the two images. Accordingly, door 310 may be tagged as a dynamic object and the potential locations and poses of the door can be identified within the accessed images.

Figure 3:
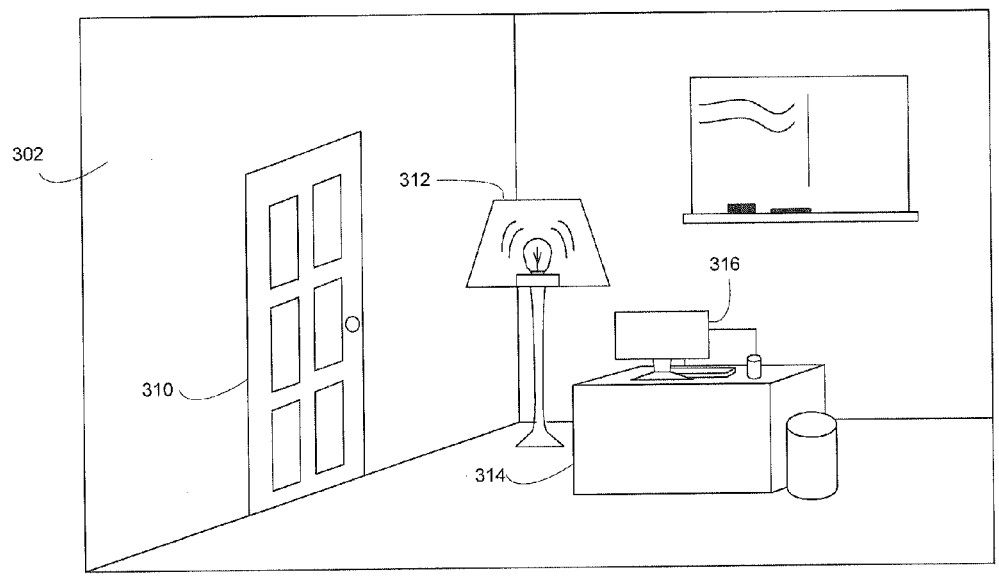
FIG. 3 is an image that may be used in accordance with aspects of the disclosure.
Figure 4:
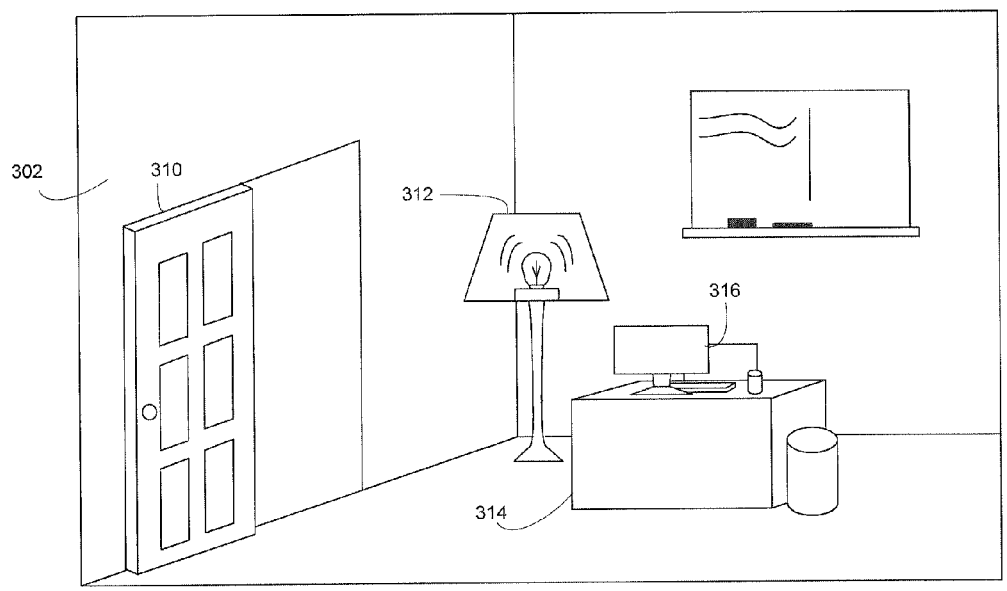
FIG. 4 is an image that may be used in accordance with aspects of the disclosure.

Server computing device 110 may then generate a 3D model based on the locations of objects identified in the accessed images (Block 914). As an example, any structure from motion algorithms may be used. Included in the 3D model may be the tagged dynamic objects identified in the images. Given that the dynamic objects have more than one potential pose or location, server computing device 110 may determine the state in which each dynamic object is to be displayed within the rendered 3D model. For example, as seen in FIGS. 3 and 4, door 310 may be either open or closed. Accordingly, in creating a 3D model of room 302, server computing device 110 may determine whether the door should be in the open state or the closed state. In addition, other images may exist in which the door is not closed, as shown in FIG. 3, but is also not fully open, as shown in FIG. 4. Based on those images, door 310 may alternatively be displayed within the rendered 3D model in a partially opened state.

Figure 7:
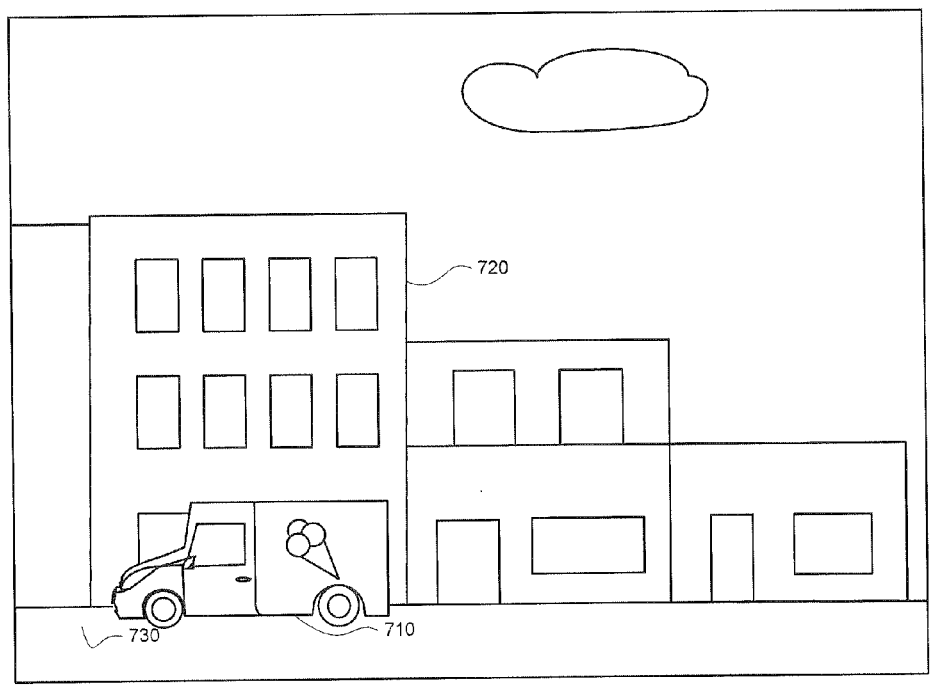
FIG. 7 is a street level image that may be used in accordance with aspects of the disclosure.
Figure 8:
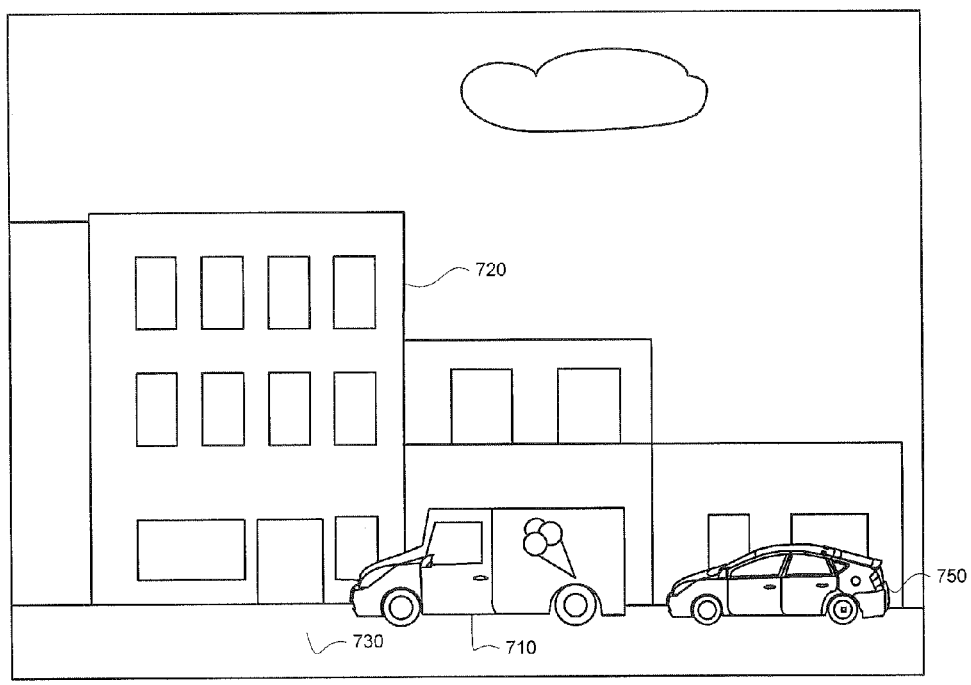
FIG. 8 is a street level image that may be used in accordance with aspects of the disclosure.

FIGS. 7 and 8 provide another example of images for which a 3D model may be generated. As seen in these figures, images 700 and 800 are street-level images that include buildings, such as building 720, and vehicles, such as vehicles 710 and 750. Using depth data associated with images 700 and 800, server computing device 110 may identify vehicle 710 and vehicle 750 as dynamic objects, as the vehicles do not have the same pose and location within images 700 and 800. In the case of vehicle 710, it has moved from being located directly in front of building 720 to being located primarily in front of a building adjacent to building 720. Vehicle 750, on the other hand, may be determined to have changed locations, as it is only present in image 800 and would have been present within image 700 as well, if it had maintained the same location.

Using instructions corresponding to operations shown in flowchart 900 of FIG. 9, server computing device 110 may generate a 3D model of the objects on or around road 730, with vehicles 710 and 750 being tagged within the generated model as dynamic objects. In determining the state in which vehicles 710 and 750 will be displayed within the generated model, server computing device 110 may analyze all available images on or around road 730, as well as all of the metadata associated with those images, as described above. In particular, server computing device 110 may identify the dates and times of the accessed images to determine whether vehicles 710 and 750 should be displayed in the rendered 3D model, as well as the location in which they should be displayed. For example, vehicle 710 might park daily along road 730 near building 720. Therefore, vehicle 710 might appear in multiple images taken on numerous dates. In contrast, vehicle 750 might only appear in one of the images accessed by server computing device 110.

In one aspect, server computing device 110 may base the determination of whether to include the features of vehicles 710 and 750 in the generated 3D model based on the number of images the vehicles appear in, and whether the vehicles appear in images taken on different dates. For example, server computing device 110 may apply a threshold value in which a dynamic object must appear in a particular percentage of images, or on a particular percentage of dates in which images were taken, in order to be displayed within the rendered 3D model. Once it has been determined that a dynamic object should be included within the 3D model, it may also be determined at which location and pose the object should be displayed.

In some instances, the objects shown in the accessed images may be in a number of similar locations. For example, vehicle 710 may be parked in one image a few inches or feet forward or backward from another image. In one aspect, server computing device 110 may analyze the differences in the location or pose of a dynamic object within two or more images to determine if the change is greater than a predetermined threshold. If the difference is not greater than a particular threshold, server computing device 110 may identify the location and pose within the two images as being the same state. In one example, the threshold may be set to correspond with the accuracy of the depth data. For example, if the depth data has a margin of error of approximately six inches, the threshold for determining whether an object is in two different states may be set to six inches or more.

Some of the dynamic objects might appear in a particular state at certain days or at certain times. For example, vehicle 710 may be a food truck that parks along road 730 during certain days of the week, or during a certain months of the year. In addition, vehicle 710 may only be located around building 720 at certain times of the day. Accordingly, server computing device 110 may analyze all available images on or around road 730 to determine patterns relating to when vehicle 750 is present around building 720 or on road 730. Server computing device 110 may then include vehicle 750 within the rendering of the 3D model based on this analysis. For example, server computing device 110 may determine, based on an analysis of a plurality of images, that the rendering of the 3D model should only display vehicle 710 in front of building 720 on weekdays between 11:00 AM and 1:00 PM. Accordingly, server computing device 110 may alter the state of the objects displayed within a rendering of the 3D model based on the date and time being represented in the rendering.

In some instances the state of the object within the 3D model may be mirrored in other applications displayed to a user. For example, room 302 shown in FIGS. 3 and 4 might be a reception area of an office, and door 310 may only be open when the office is open for business. Accordingly, a map of room 302, such as map 610 shown in FIG. 6, may display passageway 630 as being open only in instances when door 310 is displayed as being open in the rendering of the corresponding 3D model. In addition, device 120 of FIG. 6 may provide navigation in connection with map 610 and may only instruct the user to traverse passageway 630 when it is determined that the door to the passageway is open within the corresponding 3D model.

Accordingly, the objects displayed in a rendering of the 3D model, as well as the pathways provided by a navigation application, may be dependent on the date and time at which the user of device 120 is accessing the model. Alternatively, a user may be able to select a date and time for which the 3D model is to represent, including future dates and times. For example, as shown in FIG. 5, a user of device 120 may select icon 510 and indicate the particular date and time represented in the rendered 3D model 500. A user may also select icon 520 so as to step forward or backward in time within the 3D model so as to see the state of various dynamic objects change with time.

Server computing device 110 may also analyze the accessed images to determine whether a relationship exists between two or more dynamic objects. For example, if the accessed images show that two different doors within a room tend to be open at the same time and closed at the same time, then the server computing device 110 may generate a 3D model in which the state of each door is connected to one another. Accordingly, a change in a display state of one dynamic object will cause a change in the state of the second dynamic object.

In one alternative, a user may select dynamic objects displayed within the rendering of the 3D model, so as to change the state of the dynamic object. In particular, the user may change the dynamic object between the various states that the dynamic object has taken in the images of the dynamic object. For example, a user of device 120 shown in FIG. 5 could select, by clicking using a mouse and mouse pointer or by tapping with a finger or stylus on a touchscreen, door 310 within the rendering of 3D model 500, so as to change door 310 from a closed location shown in FIG. 3 to an open location shown in FIG. 4.

In addition to identifying dynamic object, server computing device 110 may also identify static objects. For example, as shown in FIGS. 3 and 4, if lamp 312 and desk 314 do not change their location or pose within the accessed images, they may be identified as static objects. However, the designation of a static object may change, if the object is found to have moved or changed poses within later images. For example, server computing device 110 receives an image in which lamp 312 is moved from one corner of room 302 to another corner, server computing device 110 may redesignate lamp 312 within the 3D model as a dynamic object. Accordingly, each identified object within the 3D model may receive a semantic tag by which it is designated as either a static or dynamic object.

As these and other variations and combinations of the features discussed above can be utilized without departing from the systems and methods as defined by the claims, the foregoing description of exemplary embodiments should be taken by way of illustration rather than by way of limitation of the disclosure as defined by the claims. It will also be understood that the provision of examples (as well as clauses phrased as "such as," "e.g.", "including" and the like) should not be interpreted as limiting the disclosure to the specific examples; rather, the examples are intended to illustrate only some of many possible aspects.

Unless expressly stated to the contrary, every feature in a given embodiment, alternative or example may be used in any other embodiment, alternative or example herein.

For instance, any appropriate sensor for detecting vehicle movements may be employed in any configuration herein. Any data structure for representing a specific driver pattern or a signature vehicle movement may be employed. Any suitable machine learning algorithms may be used with any of the configurations herein.

The invention claimed is:

1. A method for identifying dynamic objects, the method comprising:
   accessing, by one or more computing devices, a plurality of images, each having therewith associated depth data;
   determining, by the one or more computing devices, based at least in part on the depth data for each image in the plurality of images, that a first object, visible within at least one of the plurality of images, is dynamic;
   identifying, by the one or more computing devices and based on the depth data, a set of potential states of the first object;
   selecting, by the one or more computing devices, a state, from the set of potential states, in which the first object is to be displayed; and
   providing, by the one or more computing devices, a user with directions in connection with navigating a pathway within a map, wherein the directions provided to the user are based at least in part on the selected state of the first object.

2. The method of claim 1, further comprising:
   generating, by the one or more computing devices, a model of objects shown in the plurality of images, including the first object;
   receiving a request of a user to view the model; and
   providing a rendering of the model for display to the user.

3. The method of claim 2, wherein the rendering of the model displays the objects relative to a first point in time, and wherein the selected state of the first object is based on the first point in time.

4. The method of claim 1, wherein chronological data is associated with the plurality of images, and wherein selecting the state in which the first object is to be displayed is based at least in part on the chronological data.

5. The method of claim 1, further comprising:
   determining, by the one or more computing devices, based on the depth data, that a second object within at least one of the plurality of images is dynamic;
   identifying, by the one or more computing devices and based on the depth data, a set of potential states of the second object;
   determining, by the one or more computing devices, that a relationship exists between the set of potential states of the first object and the set of potential states of the second object; and
   selecting, by the one or more computing devices, a state in which the second object is to be displayed within the model based on the determined relationship between the set of potential states of the first object and the set of potential states of the second object.

6. The method of claim 1, further comprising:
displaying, by the one or more computing devices, the first object in the selected state;
receiving, by the one or more computing devices, device input from a user in connection with the displaying of the first object; and
in response to the device received input, altering the displaying of the first object from a first state to a second state in the identified set of potential states of the first object.

7. A system comprising one or more processors configured:
access a plurality of images, each having therewith associated depth data;
determine, based at least in part on the depth data for each image in the plurality of images, that a first object, within at least one of the plurality of images, is dynamic;
identify a set of potential states of the first object; and
select a state, from the set of potential states, in which the first object is to be displayed; and
provide a user with directions in connection with navigating a pathway within a map, wherein the directions provided to the user are based at least in part on the selected state of the first object.

8. The system of claim 7, wherein the one or more processors are further configured to:
generate a model of objects shown in the plurality of images, including the first object;
receive a request of a user to view the model; and
provide a rendering of the model for display to the user.

9. The system of claim 8, wherein the rendering of the model displays the objects relative to a first point in time, and wherein the selected state of the first object is based on the first point in time.

10. The system of claim 7, wherein chronological data is associated with the plurality of images, and wherein selecting the state in which the first object is to be displayed is based at least in part on the chronological data.

11. The system of claim 7, wherein the one or more processors are further configured to:
determine that a second object within at least one of the plurality of images is dynamic;
identify a set of potential states of the second object;
determine that a relationship exists between the set of potential states of the first object and the set of potential states of the second object; and
select a state in which the second object is to be displayed within the model based on the determined relationship between the set of potential states of the first object and the set of potential states of the second object.

12. The system of claim 7, wherein the one or more processors are further configured to:
display the first object in the selected state;
receive device input from a user in connection with the display of the first object; and
in response to the device input, alter the display of the first object from a first state to a second state in the identified set of potential states of the first object.

13. A method for identifying dynamic objects, the method comprising:
accessing, by one or more computing devices, a plurality of images, each having therewith associated depth data;
determining, by the one or more computing devices, based at least in part on the depth data for each image in the plurality of images, that a first object, visible within at least one of the plurality of images, is dynamic;
identifying, by the one or more computing devices and based on the depth data, a set of potential states of the first object;
selecting, by the one or more computing devices, a state, from the set of potential states, in which the first object is to be displayed;
providing, by the one or more computing devices, a user with directions in connection with navigating a pathway within a map, wherein the directions provided to the user are based at least in part on the selected state of the first object
determining, by the one or more computing devices, based on the depth data, that a second object within at least one of the plurality of images is dynamic;
identifying, by the one or more computing devices and based on the depth data, a set of potential states of the second object;
determining, by the one or more computing devices, that a relationship exists between the set of potential states of the first object and the set of potential states of the second object; and
selecting, by the one or more computing devices, a state in which the second object is to be displayed within the model based on the determined relationship between the set of potential states of the first object and the set of potential states of the second object.

14. The method of claim 13, further comprising:
generating, by the one or more computing devices, a model of objects shown in the plurality of images, including the first object;
receiving a request of a user to view the model; and
providing a rendering of the model for display to the user.

15. The method of claim 14, wherein the rendering of the model displays the objects relative to a first point in time, and wherein the selected state of the first object is based on the first point in time.

16. The method of claim 13, wherein chronological data is associated with the plurality of images, and wherein selecting the state in which the first object is to be displayed is based at least in part on the chronological data.

* * * * *